US010015329B2

(12) United States Patent
Kakii

(10) Patent No.: US 10,015,329 B2
(45) Date of Patent: Jul. 3, 2018

(54) INFORMATION MANAGEMENT APPARATUS, INFORMATION MANAGEMENT METHOD, AND INFORMATION DEVICE

(71) Applicant: Hiroshi Kakii, Tokyo (JP)

(72) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/702,898

(22) Filed: May 4, 2015

(65) Prior Publication Data

US 2015/0334253 A1 Nov. 19, 2015

(30) Foreign Application Priority Data

May 16, 2014 (JP) ................................. 2014-102365
Dec. 18, 2014 (JP) ................................. 2014-256165
Jan. 13, 2015 (JP) ................................. 2015-003997

(51) Int. Cl.
*H04N 1/00* (2006.01)
*H04N 1/44* (2006.01)

(52) U.S. Cl.
CPC ..... *H04N 1/00344* (2013.01); *H04N 1/00074* (2013.01); *H04N 1/44* (2013.01)

(58) Field of Classification Search
CPC ......... H04N 1/44; H04N 1/00; H04N 1/00074
See application file for complete search history.

(56) References Cited

U.S. PATENT DOCUMENTS

| 2005/0203881 A1* | 9/2005 | Sakamoto | G06F 21/552 |
| 2006/0053181 A1* | 3/2006 | Anand | G06F 11/0715 |
| 2013/0110978 A1* | 5/2013 | Gordon | H04N 21/2665 709/218 |
| 2015/0020150 A1* | 1/2015 | Hagiuda | H04N 1/44 726/1 |
| 2015/0153982 A1* | 6/2015 | Berarducci | H04N 1/00 358/1.15 |

FOREIGN PATENT DOCUMENTS

| JP | 2005-115519 | 4/2005 |
| JP | 2006-033529 | 2/2006 |
| JP | 2006-146297 | 6/2006 |
| JP | 2010-271916 | 12/2010 |
| JP | 5139485 | 11/2012 |
| JP | 2013-196050 | 9/2013 |

* cited by examiner

*Primary Examiner* — Iriana Cruz

(74) *Attorney, Agent, or Firm* — Oblon, McClelland, Maier & Neustadt, L.L.P.

(57) ABSTRACT

An information management apparatus for managing information about information devices connected to the information management apparatus via a network. The information management apparatus includes an acquisition unit configured to acquire information about current setting from the information devices, a diagnosis unit configured to diagnose setting of the each information device based on the acquired information, a generation unit configured to generate a diagnosis result report containing findings about setting based on a diagnosis result associated with a management area where the information devices are arranged, and an output unit configured to output the diagnosis result report generated by the generation unit.

20 Claims, 14 Drawing Sheets

FIG.4

| MANAGEMENT AREA ID | 100001 |
|---|---|
| DEVICE ID | 00A |
| IP ADDRESS | xxx. xxx. xxx. xxx |
| NETWORK ROBUSTNESS | 2048-bit RSA |
| IDENTITY AUTHENTICATION | REQUIRED |
| ADMINISTRATOR'S PASSWORD | OTHER THAN DEFAULT |
| PASSWORD LENGTH | 10 CHARACTERS |
| CHARACTER TYPE OF PASSWORD (ALPHABETIC CHARACTER) | INCLUDED |
| CHARACTER TYPE OF PASSWORD (NUMERIC CHARACTER) | INCLUDED |
| AUTOMATIC LOGOUT | ENABLED |
| LOCKOUT | ENABLED |
| DATA ERASURE OPTION | ENABLED |
| HDD ENCRYPTION | ENABLED |
| FAILED LOGIN ATTEMPTS/TOTAL NUMBER OF ATTEMPTS | 17/150 |
| DETECTED NUMBER OF DoS ATTACKS | 0 |

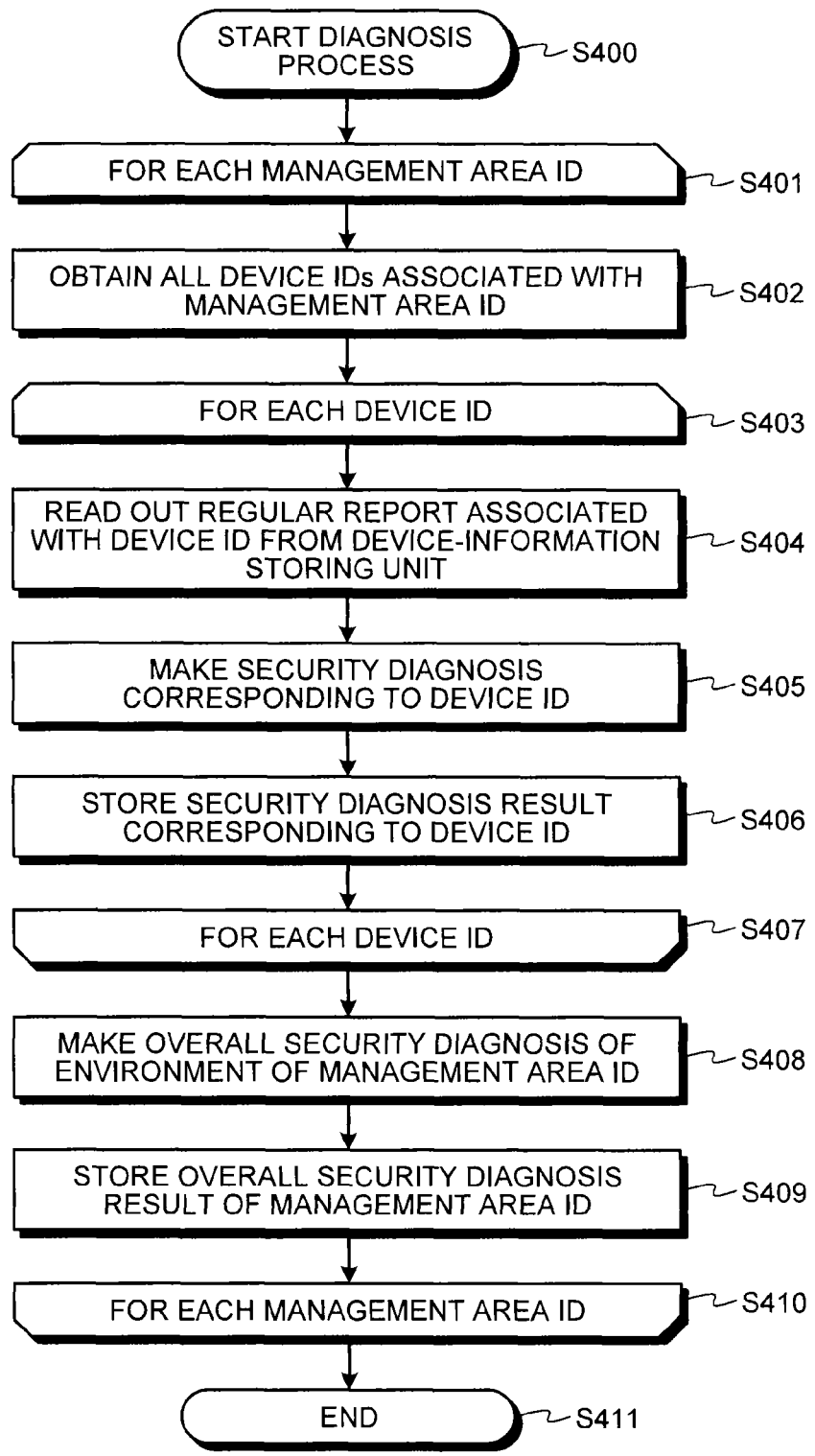

FIG.6A

| DEVICE ID | MANAGEMENT AREA ID |
|---|---|
| 00A | 100001 |
| 00B | 100001 |
| 00C | 100001 |
| 00D | 100002 |
| 00E | 100002 |
| ⋮ | ⋮ |

FIG.6B

| MANAGEMENT AREA ID | 100001 | | |
|---|---|---|---|
| DIAGNOSIS ITEM | CONFORMANCE LEVEL | | |
| | NORMAL | CAUTION | WARNING |
| IP ADDRESS | LOCAL IP | – | GLOBAL IP |
| NETWORK ROBUSTNESS | SHA-2, 2048-bit RSA, … | SHA-1, 1024-bit RSA, 2TDES, … | ENCRYPTION DISABLED |
| IDENTITY AUTHENTICATION | REQUIRED | NOT REQUIRED | – |
| ADMINISTRATOR'S PASSWORD | OTHER THAN DEFAULT | – | DEFAULT |
| PASSWORD LENGTH | 8 CHARACTERS OR MORE | 4 TO 7 CHARACTERS | 1 TO 3 CHARACTERS |
| CHARACTER TYPE OF PASSWORD | MIXTURE OF ALPHABETIC AND NUMERIC CHARACTERS | – | ONLY NUMERIC CHARACTERS |
| AUTOMATIC LOGOUT | ENABLED | – | DISABLED |
| LOCKOUT | ENABLED | DISABLED | – |
| DATA ERASURE OPTION | ENABLED | DISABLED | – |
| HDD ENCRYPTION | ENABLED | – | DISABLED |
| LOGIN FAILURE RATE | 10% OR LESS | 10% OR MORE AND LESS THAN 30% | 30% OR MORE |
| PRESENCE OR ABSENCE OF DoS ATTACKS | NONE | – | DETECTED |

FIG.7

| MANAGEMENT AREA ID | 100001 |
|---|---|
| DEVICE ID | 00A |
| IP ADDRESS | NORMAL |
| NETWORK ROBUSTNESS | NORMAL |
| IDENTITY AUTHENTICATION | NORMAL |
| ADMINISTRATOR'S PASSWORD | NORMAL |
| PASSWORD LENGTH | NORMAL |
| CHARACTER TYPE OF PASSWORD | NORMAL |
| AUTOMATIC LOGOUT | NORMAL |
| LOCKOUT | NORMAL |
| DATA ERASURE OPTION | NORMAL |
| HDD ENCRYPTION | NORMAL |
| LOGIN FAILURE RATE | CAUTION |
| PRESENCE OR ABSENCE OF DoS ATTACKS | NORMAL |

FIG.8

| MANAGEMENT AREA ID | 100001 | | | | |
|---|---|---|---|---|---|
| ASSESSMENT ITEM | OVERALL RESULT | DEVICE ID | | | REMARKS |
| | | 00A | 00B | 00C | |
| IP ADDRESS | NORMAL | NORMAL | NORMAL | NORMAL | — |
| NETWORK ROBUSTNESS | WARNING | NORMAL | NORMAL | WARNING | Network encryption for [DEVICE ID: 00C] is disabled |
| IDENTITY AUTHENTICATION | NORMAL | NORMAL | NORMAL | NORMAL | — |
| ADMINISTRATOR'S PASSWORD | NORMAL | NORMAL | NORMAL | NORMAL | — |
| PASSWORD LENGTH | NORMAL | NORMAL | NORMAL | NORMAL | Length is sufficiently long; however, there is variation in length among devices. [DEVICE ID: 00A]: 10 characters, [DEVICE ID: 00B]: 10 characters, [DEVICE ID: 00C]: 8 characters |
| CHARACTER TYPE OF PASSWORD | NORMAL | NORMAL | NORMAL | NORMAL | — |
| AUTOMATIC LOGOUT | NORMAL | NORMAL | NORMAL | NORMAL | — |
| LOCKOUT | NORMAL | NORMAL | NORMAL | NORMAL | — |
| DATA ERASURE OPTION | NORMAL | NORMAL | NORMAL | NORMAL | — |
| HDD ENCRYPTION | NORMAL | NORMAL | NORMAL | NORMAL | — |
| LOGIN FAILURE RATE | WARNING | CAUTION | WARNING | NORMAL | [DEVICE ID: 00A] is possibly attacked. [DEVICE ID: 00B] is highly possibly attacked. |
| PRESENCE OR ABSENCE OF DoS ATTACKS | NORMAL | NORMAL | NORMAL | NORMAL | — |

FIG.10A

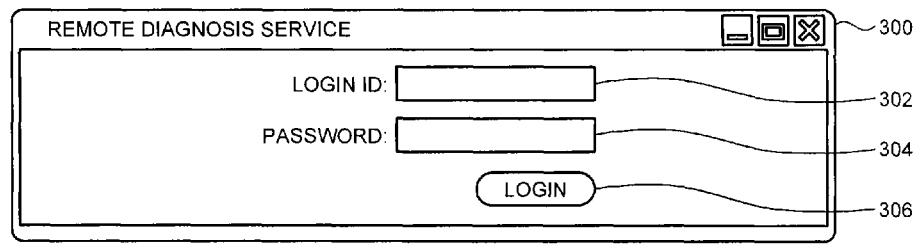

FIG.10B

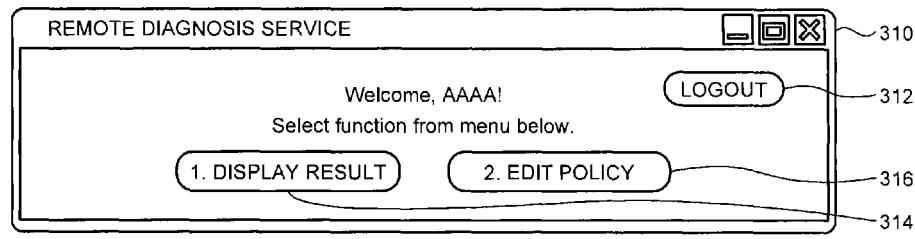

FIG.10C

| DIAGNOSIS ITEM | OVERALL RESULT | DEVICE A | DEVICE B | DEVICE C | SUPPLEMENTAL REMARKS |
|---|---|---|---|---|---|
| IP ADDRESS | NORMAL | NORMAL | NORMAL | NORMAL | |
| NETWORK ROBUSTNESS | WARNING | NORMAL | NORMAL | WARNING | Encryption for device C is disabled |
| IDENTITY AUTHENTICATION | NORMAL | NORMAL | NORMAL | NORMAL | |
| ADMINISTRATOR'S PASSWORD | NORMAL | NORMAL | NORMAL | NORMAL | |
| PASSWORD LENGTH | NORMAL | NORMAL | NORMAL | NORMAL | Password length of device C is smaller than other devices |
| CHARACTER TYPE OF PASSWORD | NORMAL | NORMAL | NORMAL | NORMAL | – |
| AUTOMATIC LOGOUT | NORMAL | NORMAL | NORMAL | NORMAL | – |
| LOCKOUT | NORMAL | NORMAL | NORMAL | NORMAL | – |

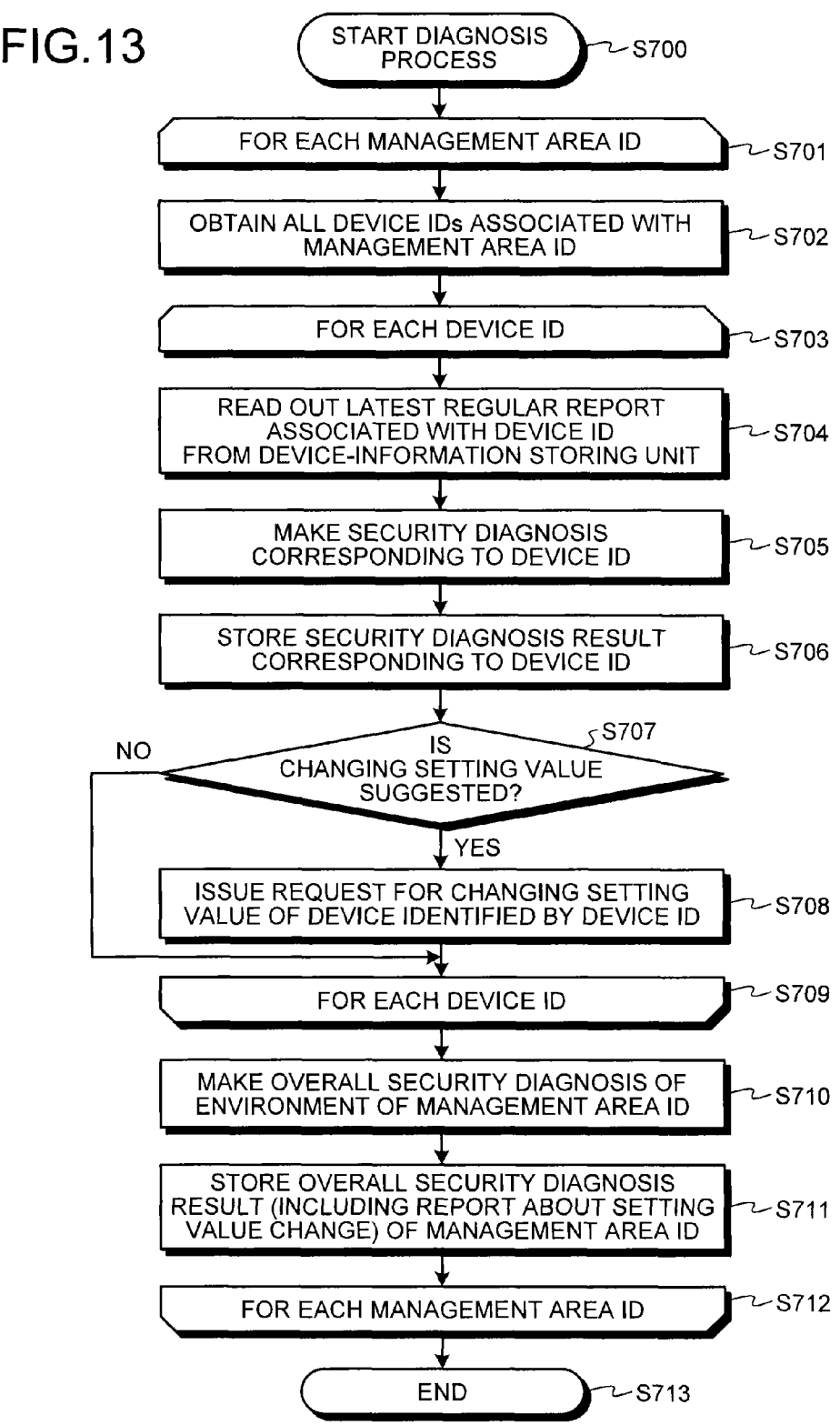

INFORMATION MANAGEMENT APPARATUS, INFORMATION MANAGEMENT METHOD, AND INFORMATION DEVICE

CROSS-REFERENCE TO RELATED APPLICATIONS

The present application claims priority to and incorporates by reference the entire contents of Japanese Patent Application No. 2014-102365 filed in Japan on May 16, 2014, Japanese Patent Application No. 2014-256165 filed in Japan on Dec. 18, 2014 and Japanese Patent Application No. 2015-003997 filed in Japan on Jan. 13, 2015.

BACKGROUND OF THE INVENTION

1. Field of the Invention

The present invention relates to a technique for managing information devices and, more particularly, to an information management apparatus, an information management method, and an information device for diagnosing the information device.

2. Description of the Related Art

In recent years, concerns about threats that can be caused by access to an information device such as a multifunction peripheral, a printer, or a projector via the Internet have arisen. The threats stem from the background that the Internet has become commonplace and such information devices has been highly functional. From this background, it has become important to apply security management of a security level equivalent to that of personal computers and network servers to such information devices.

At installation of an information device, settings of the information device are generally performed by a network administrator(s) according to a setup guide of the device. So long as the settings are configured in accordance with the guide, security management will be carried out appropriately. However, if an environmental change such as relocation of an office, an organizational change, or a change in network configuration during operation should occur, a large load will be placed on the administrator(s). This is because complexity of setting items of the information device and the like do not make it easy to maintain the settings appropriately.

Such security management on user's side has been known in Japanese Patent No. 5139485 (Patent document 1). A remote security-diagnosis system aimed at reducing load of visiting a client's site to maintain security is disclosed in the patent document 1. The remote security-diagnosis system includes a to-be-diagnosed server including an agent, an information collecting server configured to transmit to the agent a command to conduct security diagnosis of the to-be-diagnosed server and transmit diagnosis data, which is a result of the security diagnosis, via a public communication network, and a diagnosis server configured analyze the diagnosis data received from the information collecting server.

A technique aimed at reducing load, which is placed on the network administrator(s), of carrying out security management of a printing apparatus is disclosed in Japanese Laid-open Patent Application No. 2005-115519 (Patent document 2). The patent document 2 discloses a configuration including a security diagnosis device and configured to set a security level of the printing apparatus, provide a notification of a diagnosis result, and restrict printing depending on the security level.

The conventional technique disclosed in the patent document 1 requires that the information collecting server be placed on the user's side. This technique is also disadvantageous in that settings can be checked only on a per-device basis and incapable of conducting diagnosis on a per-management-area basis, e.g., on a per-office basis. Accordingly, this technique is not sufficient from the perspective of reducing the load placed on user's administrator(s). The conventional technique in the patent document 2 is disadvantageous in that it is difficult to maintain security if an office environment should change. This technique is also incapable of diagnosing settings on a per-management-area basis, e.g., on a per-office basis.

Therefore, there is a need for an information management apparatus, an information management method, and an information device for being capable of remotely diagnosing setting of the information device in a management area where the information device is installed and adapting to an environmental change in the management area.

SUMMARY OF THE INVENTION

It is an object of the present invention to at least partially solve the problems in the conventional technology.

The present invention provides an information management apparatus for managing information about information devices connected to the information management apparatus via a network. The information management apparatus includes an acquisition unit configured to acquire information about current setting from the information devices, a diagnosis unit configured to diagnose setting of the each information device based on the acquired information, a generation unit configured to generate a diagnosis result report containing findings about setting based on a diagnosis result associated with a management area where the information devices are arranged, and an output unit configured to output the diagnosis result report generated by the generation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a data structure of report data accumulated in a device-information storing unit according to the first embodiment;

FIG. 5 is a flowchart illustrating a diagnosis process to be performed on a per-information-device basis and on a per-management-area basis by a diagnosis processing unit according to a specific embodiment;

FIGS. 6A and 6B are diagrams illustrating management data for information devices and a data structure of a diagnosis policy, respectively, used by the device management system according to the first embodiment;

FIG. 7 is a diagram illustrating a data structure of per-information-device diagnosis result data stored in a diagnosis-result storing unit according to the first embodiment;

FIG. 8 is a diagram illustrating a data structure of per-management-area security-diagnosis result data stored in the diagnosis-result storing unit according to the first embodiment;

FIGS. 10A to 10C are diagrams illustrating graphical user interfaces displayed on an administrator's terminal according to the first embodiment;

FIG. 13 is a flowchart illustrating a diagnosis process to be performed on a per-information-device basis and on a per-management-area basis by the diagnosis processing unit according to a second embodiment.

DETAILED DESCRIPTION OF THE PREFERRED EMBODIMENTS

Exemplary embodiments of the present invention are described below. It should be noted that embodiments are not limited to those described below. In the embodiments described below, an example in which an information management apparatus and an information management system are embodied as a device-security management server and a device management system, respectively, is described.

Figure 1:
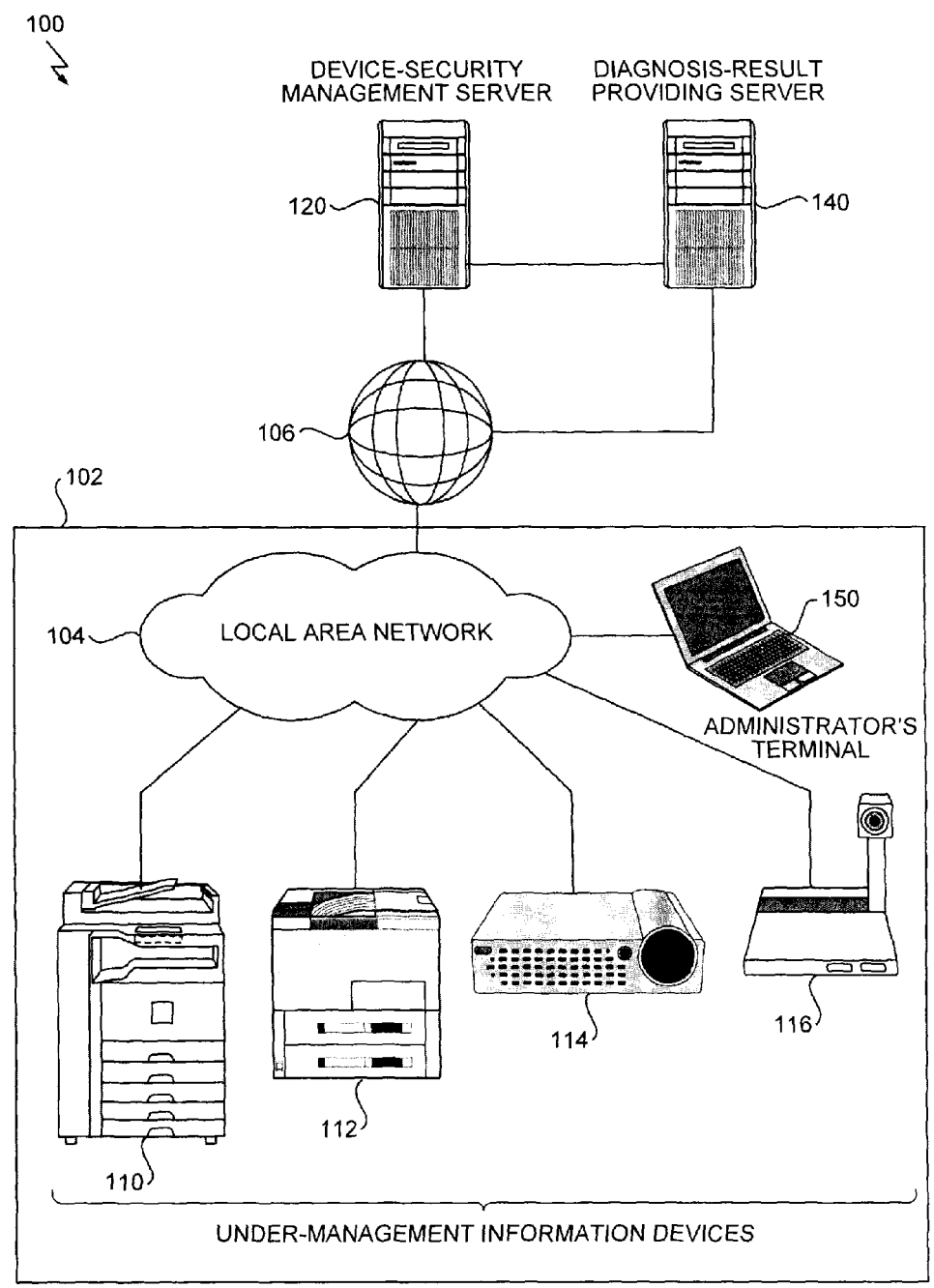
FIG. 1 is a schematic diagram illustrating a device management system according to a first embodiment.

FIG. 1 is a schematic diagram illustrating a device management system 100 according to a first embodiment. As illustrated in FIG. 1, the device management system 100 includes a device-security management server 120 configured to diagnose security of under-management information devices and a diagnosis-result providing server 140 configured to provide a security diagnosis result to a user. The user may typically be an administrator on service user's side. FIG. 1 illustrates a predetermined office 102 that is managed by the device-security management server 120. One or more information devices denoted by 110, 112, 114, and 116 (hereinafter, "information devices 110 to 116"), are installed in the office 102. The office 102 is one of zones (hereinafter, "management areas") which are units managed in the first embodiment. The one or more information devices 110 to 116 in the office 102 are registered as entities to be managed by the device-security management server 120.

The office 102 includes a local area network (LAN) 104 which may be a wired, wireless, or a combination of wired and wireless network. The under-management information devices 110 to 116 are connected to the LAN 104. The information devices 110 to 116 in the office 102 are connected to the device-security management server 120 installed separately from the office 102 via a public network 106 such as the Internet.

In the first embodiment, the office 102 is, but not limited to, a site of a service user(s) receiving maintenance and management service for the information devices. In contrast thereto, the device-security management server 120 and the diagnosis-result providing server 140 are installed at a site of a service provider that provides the maintenance and management service for the information devices. Remotely connecting the information devices 110 to 116 to the device-security management server 120 via a network means, more specifically, a configuration where the information devices 110 to 116 are installed separately from the device-security management server 120, connecting therebetween via a network, e.g., the public network 106. The remote connection include connecting, in a configuration where the information devices 110 to 116 and the device-security management server 120 are installed at remote sites, the information devices 110 to 116 to the device-security management server 120 via a private network utilizing a VPN (virtual private network) or a dedicated line.

FIG. 1 illustrates example types of the under-management information device. Referring to FIG. 1, an MFP (multifunction peripheral) 110, a laser printer 112, a projector 114, and a teleconference terminal 116 are given as the examples. Note that under-management information devices are not limited to those illustrated in FIG. 1 but can be any electronic device connected to a network. Examples of the electronic device include an image forming device, an image reading device, an image communication device, a video projector, a video display device, a teleconference terminal, an interactive whiteboard, a personal digital assistant, an image capture device, a vending machine, a medical device, a power supply device, an air-conditioning system, a metering device for gas, water, electricity, or the like and network home appliances such as a refrigerator and a washing machine. Each of the device-security management server 120 and the diagnosis-result providing server 140 may typically be configured by a general-purpose computer such as a server computer.

In the office 102 illustrated in FIG. 1, an administrator's terminal 150 is connected to the LAN 104. The administrator's terminal 150 is a terminal to be operated by an administrator(s) of the office 102 to access the diagnosis-result providing server 140 via the public network 106 and view a diagnosis result. In the first embodiment, it is assumed that the administrator's terminal 150 is installed in the office 102; however, a location of the administrator's terminal 150 is not limited thereto. The administrator's terminal 150 may typically be configured by a personal computer, a tablet computer, a smartphone, or the like.

It is desired to apply security management of a security level equivalent to that of a personal computer or a network server to the under-management information devices 110 to 116. However, there can be a case where the information devices 110 to 116 have a factor that makes security management troublesome for the administrator(s). Examples of the factor include security management items or menus different from a personal computer or a server computer, absence of a display device in one or more of the information devices 110 to 116, and a small size of a display device even if the display device is provided. Furthermore, a large number of information devices can be arranged in an office. Accordingly, it is difficult to detect a security problem across the entire office if security settings are on a per-device basis. In particular, from a perspective of security management, a weakest security setting can cause a threat to the entire office. For this reason, a security management on a per-office basis is desired.

In the device management system 100 according to the first embodiment, the under-management information devices 110 to 116 provide reports about their own current security settings to the device-security management server 120 at regular or irregular intervals. The device-security management server 120 receives the reports from the information devices 110 to 116, accumulates the reports, and conducts diagnosis of security setting of the information devices 110 to 116 based on the reports in accordance with a predetermined schedule. The device-security management server 120 generates, from a result of the diagnosis associated with a management area where the information devices are arranged, a security-diagnosis result report containing suggestions and comments on setting in the management area, and outputs the report to the diagnosis-result providing server 140.

The diagnosis-result providing server 140 is configured to receive the security diagnosis result from the device-security management server 120, store the result, and wait for receiving a request for viewing the diagnosis result from the administrator's terminal 150. The diagnosis-result providing server 140 is configured to, in response to a request for viewing the diagnosis result administrator's terminal 150, provide the security diagnosis result. This allows remotely diagnosing setting of the information devices in the management area and adapting to an environmental change in the management area where the information devices are installed.

In a more preferable embodiment, the device-security management server 120 may be configured to, in response to a request made by a user for a settings change based on the security-diagnosis result report, transmit a request for the settings change according to the request to an information device involved in the request for the settings change. This allows the device-security management server 120 to correct inappropriate security settings of the information device.

Figure 2:
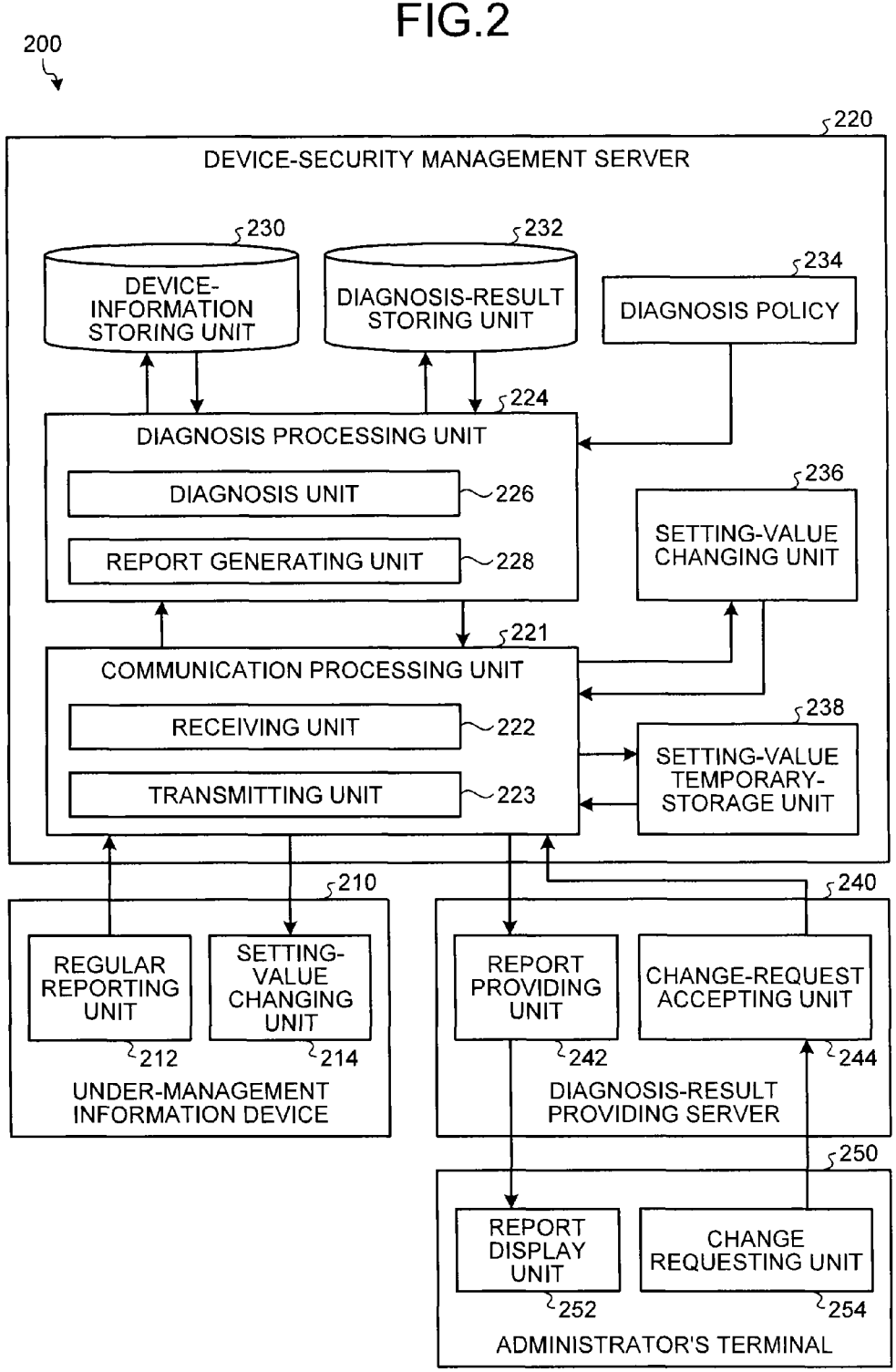
FIG. 2 is a functional block diagram illustrating a configuration of the device management system according to the first embodiment.

Security management function implemented by the device management system 100 according to the first embodiment is described more specifically below with reference to FIGS. 2 to 12B. FIG. 2 is a functional block diagram illustrating a configuration of the device management system 100 according to the first embodiment. FIG. 2 indicates main flows of various types of information by arrows.

A functional block 200 of the device management system 100 includes a functional block 210 implemented on the under-management information device 110, a functional block 220 implemented on the device-security management server 120, a functional block 240 implemented on the diagnosis-result providing server 140, and a functional block 250 implemented on the administrator's terminal 150. Hereinafter, the MFP 110 is referred to as the under-management information device 110 representing the information devices 110 to 116.

The functional block 220 on the device-security management server 120 includes a communication processing unit 221, a diagnosis processing unit 224, a device-information storing unit 230, a diagnosis-result storing unit 232, and diagnosis policies 234. In a preferred embodiment, the functional block 220 may further include a setting-value changing unit 236 and a setting-value temporary-storage unit 238.

The communication processing unit 221 includes a communication interface that allows the device-security management server 120 to communicate with the external diagnosis-result providing server 140 and the under-management information device 110. More specifically, the communication processing unit 221 includes a receiving unit 222 and a transmitting unit 223. In the first embodiment, the receiving unit 222 functions as an acquisition unit that acquires information from the information device 110 about current security settings thereof. In the first embodiment, the transmitting unit 223 functions as an output unit that outputs the generated security-diagnosis result report to the diagnosis-result providing server 140.

The diagnosis processing unit 224 receives the report about the current security settings from the under-management information device 110 and diagnoses security setting of the under-management information device 110 based on the report. More specifically, the diagnosis processing unit 224 includes a diagnosis unit 226 and a report generating unit 228.

The diagnosis unit 226 receives the report about the current security settings from the under-management information device 110 and accumulates the report in the device-information storing unit 230. The diagnosis unit 226 reads out reports from the device-information storing unit 230 on a per-management-area basis in accordance with a predetermined schedule and diagnoses security setting of each of the under-management information devices 110 based on the reports on the per-management-area basis. Upon obtaining diagnosis results of the respective under-management information devices 110, the diagnosis unit 226 stores the diagnosis results in the diagnosis-result storing unit 232. The diagnosis unit 226 corresponds to "diagnosis unit" in the first embodiment.

The report generating unit 228 reads out security diagnosis result of each of the under-management information devices 110 associated with a management area on the per-management-area basis from the diagnosis-result storing unit 232. The report generating unit 228 generates a security-diagnosis result report for each of the management areas from the read-out per-device security diagnosis results. The security-diagnosis result report contains findings on setting in the management area. The generated security-diagnosis result report is transmitted to the diagnosis-result providing server 140 via the transmitting unit 223. The report is preferably processed so that a user that receives the report can view the report.

The per-management-area security diagnosis result report is obtained by integrating security diagnosis results of a plurality of information devices in a management area together. In a specific embodiment, as will be described in detail later, the per-management-area security diagnosis result report can determine that one diagnosis result that least conforms to conformance criteria among the diagnosis results of the plurality of information devices is an overall result. This is because a weakest security setting can cause a threat to the entire management area. The report generating unit 228 corresponds to "generation unit" in the first embodiment.

The device-information storing unit 230 is a database that stores the report on the current security settings received by the receiving unit 222 from the information device 110 and manages the report by associating the report with a management area identifier (hereinafter, "management area ID") for identifying the office 102 and a device identifier (hereinafter, "device ID") for identifying the under-management information device 110 from which the report is provided. The diagnosis-result storing unit 232 is a database that stores per-information-device diagnosis results and per-management-area diagnosis results generated by the diagnosis processing unit 224 and manages the results by associating each of the results with a corresponding management area ID and a device ID for identifying the diagnosed under-management information device 110.

Each of the diagnosis policies 234 is a policy to be referred to each time when a diagnosis is conducted on the under-management-information-device basis and on the per-management-area basis and defines what setting of each of diagnosis items conforms to predetermined security conformance criteria. The diagnosis policy 234 can contain information associating a conformance state with each of possible setting options for each of predetermined diagnosis items. The conformance state indicates whether or not the setting option conforms to the conformance criteria and, if the setting option conforms to the criteria, to what extent the setting option conforms to the criteria. The diagnosis policy 234 may further include an integration method as to how to integrate diagnosis results of a plurality of under-management information devices.

For purpose of security management, operational policies vary in severity among management areas. Accordingly, a preferred embodiment may be configured such that the diagnosis policies 234 are managed on the per-management-area basis, and each of the diagnosis policies 234 contains a custom policy uniquely created or a predetermined policy associated with a plurality of security levels (e.g., "high", "medium", and "low"). The diagnosis policy 234 may be appropriately edited or selected by a user to adapt to characteristics of a management area.

A preferred embodiment may be configured such that the receiving unit 222 of the communication processing unit 221 further receives a request made by a user for a settings change based on the diagnosis result report and passes the request to the setting-value changing unit 236. The setting-value changing unit 236 performs setting-value check and format conversion for each of the devices based on the request for the settings change passed from the receiving unit 222, and causes the transmitting unit 223 of the communication processing unit 221 to transmit a request for the settings change based on the request to the information device involved in the request for the settings change. The setting value check denotes a process of checking whether or not a received post-change setting value is a value selectable to the information device involved in the request for the settings change. The format conversion denotes a process of converting the setting value into a format interpretable by the information device involved in the request for the settings change.

The setting-value temporary-storage unit 238 is a storage unit that temporarily stores the request for the settings change that is based on a request for the settings change. In the first embodiment, the device-security management server 120 does not initiate communication to the information device 110 in the office 102. Instead, after a settings change is requested, a request for the settings change is transmitted from an information device involved in the request for the settings change at the timing when communication is first initiated by the information device. In short, the first embodiment is configured so that communication is initiated by the information device 110. The information device 110 periodically initiates communication, such as polling, to the device-security management server 120. The request for the settings change is transmitted to the information device 110 together with a response to the communication initiated by the information device 110.

The functional block 210 on the under-management information device 110 includes a regular reporting unit 212 and a setting-value changing unit 214. In the first embodiment, the regular reporting unit 212 regularly transmits a report about current security settings of the information device 110 to the device-security management server 120. The setting-value changing unit 214 receives a request for a settings change from the device-security management server 120 and performs a process of changing a setting value of a setting item involved in the request. Communication between the information device 110 and the device-security management server 120 is carried out with and secured by encrypted communication such as SSL (secure sockets layer).

The functional block 240 on the diagnosis-result providing server 140 includes a report providing unit 242 and a change-request accepting unit 244. The functional block 250 on the administrator's terminal 150 includes a report display unit 252 and a change requesting unit 254.

In a specific embodiment, the diagnosis-result providing server 140 has web server functions. The report providing unit 242 and the change-request accepting unit 244 are provided as the web server functions. The administrator's terminal 150 includes a web client such as a web browser. The report display unit 252 and the change requesting unit 254 are implemented on the web client based on HTML (hypertext markup language) data acquired from the diagnosis-result providing server 140.

The report display unit 252 of the administrator's terminal 150 requests the diagnosis-result providing server 140 for a diagnosis result report and, upon receiving the report from the diagnosis-result providing server 140, displays the report on a display device such as LCD. The report providing unit 242 of the diagnosis-result providing server 140 performs login authentication of a user of the administrator's terminal 150. The report providing unit 242 transmits, in response to a report request from the administrator terminal 150, a diagnosis result report of a management area for which a login-authenticated user is registered as an administrator so that the diagnosis result report is viewed by the user. The report display unit 252 corresponds to "viewer unit" in the first embodiment.

A preferred embodiment may be configured such that the change requesting unit 254 of the administrator's terminal 150 can request the diagnosis-result providing server 140 to change settings in response to an operation made by the user base on the diagnosis result report. The change-request accepting unit 244 of the diagnosis-result providing server 140 can accept the request for the settings change from the administrator's terminal 150 and, in response thereto, transmit the request made by the user for the settings change to the device-security management server 120. Upon receiving the request for the settings change, the device-security management server 120 operates as follows as described earlier. The setting-value changing unit 236 performs format conversion and the like based on the request for the settings change transmitted from the diagnosis-result providing server 140 and causes the request for the settings change to be temporarily stored in the setting-value temporary-storage unit 238. Thereafter, the transmitting unit 223 of the communication processing unit 221 transmits a request for the settings change to the information device involved in the request for the settings change.

Figure 3:
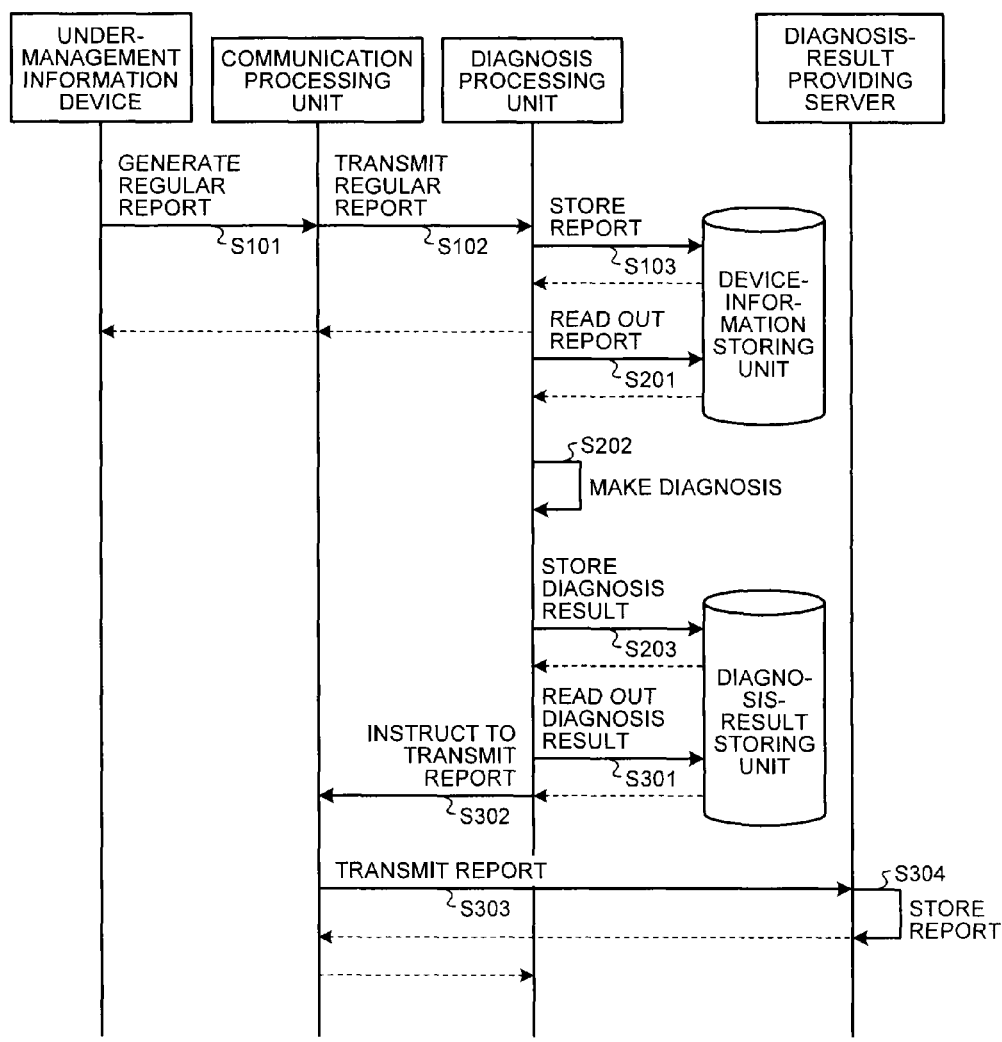
FIG. 3 is a sequence diagram illustrating processing from regular reporting to report storing of a security management to be performed by the device management system according to the first embodiment.
Figure 9:
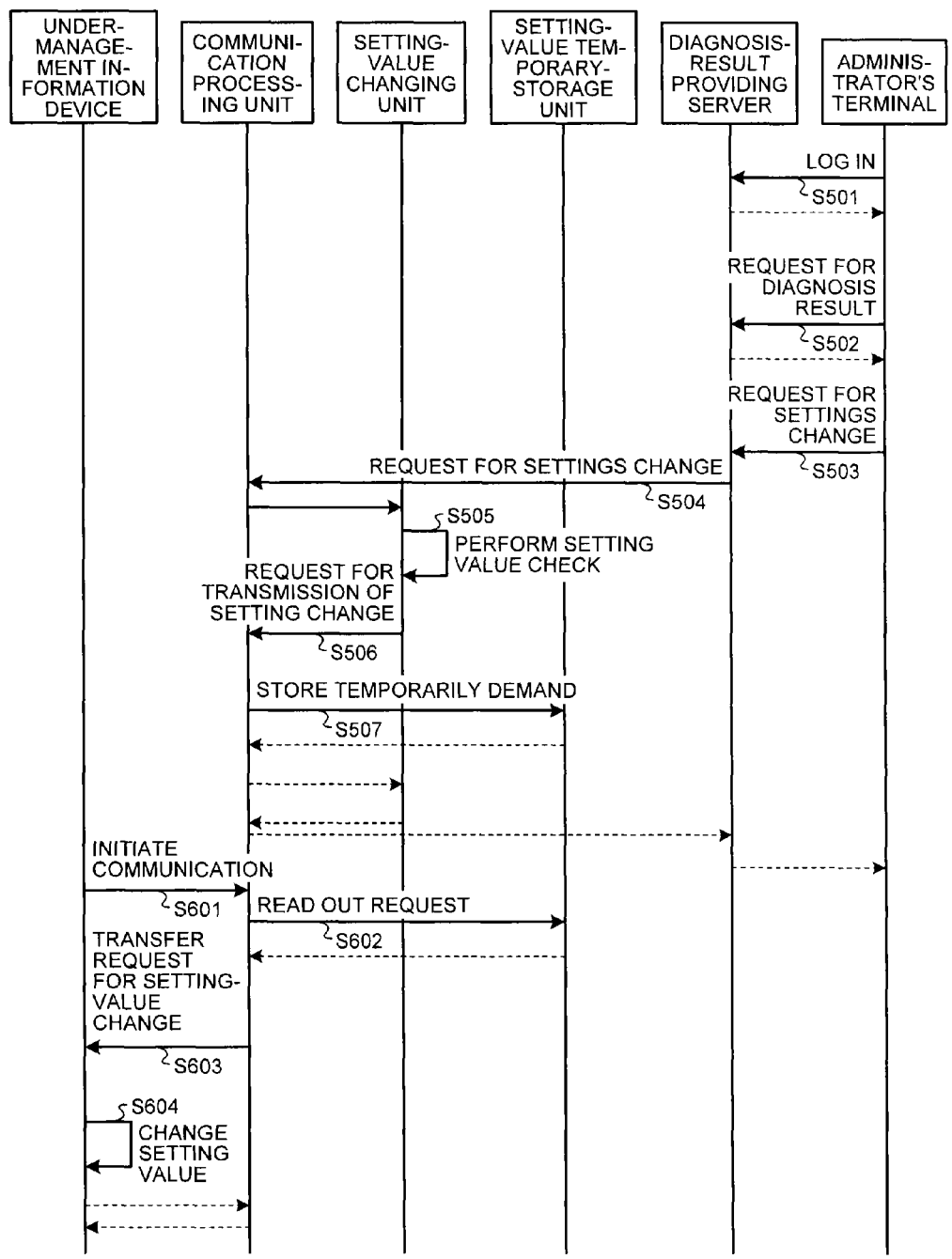
FIG. 9 is a sequence diagram illustrating processing from diagnosis result viewing to making a settings change of the security management to be performed by the device management system according to the first embodiment.

Processes to be performed by the device management system 100 according to the first embodiment to implement the security management function are described more specifically below with reference to FIGS. 3 to 12B. FIGS. 3 and 9 are sequence diagrams illustrating a security management process to be performed by the device management system 100 according to the first embodiment. FIG. 3 illustrates processing from regular reporting from the under-management information device 110 to storing a report in the diagnosis-result providing server 140 of the security management. FIG. 9 illustrates processing from viewing a diagnosis result using the administrator's terminal 150 to making a settings change. FIGS. 4 and 6A to 8 are diagrams illustrating data structures of various data used by the device management system 100 according to the first embodiment. FIG. 5 is a flowchart illustrating a diagnosis process to be performed on the per-information-device basis and on the per-management-area basis by the diagnosis processing unit according to a specific embodiment. FIGS. 10A through 12B are diagrams illustrating graphical user interfaces (GUIs) to be displayed on the administrator's terminal 150 according to the first embodiment.

The report receiving process illustrated in FIG. 3 is started at S101 by a specific one of the under-management information devices 110 upon arrival of scheduled regular reporting time. At S101, the under-management information device 110 generates report data based on current security settings applied to the information device 110 by the regular reporting unit 212 and transmits a regular report to the device-security management server 120. At S102, the communication processing unit 221 of the device-security management server 120 passes the regular report received from the under-management information device 110 to the diagnosis processing unit 224. At S103, the diagnosis processing unit 224 stores the received regular report in the device-information storing unit 230. Then, the process ends.

FIG. 3 also illustrates the diagnosis process. The diagnosis process illustrated in FIG. 3 starts at S201 in response to occurrence of an event that triggers starting the preset diagnosis process. The diagnosis process can be performed regularly as is the regular reporting and may be appropriately scheduled depending on desired frequency of the diagnosis. For instance, the diagnosis process may be performed at desired intervals such as once an hour, day, week, or month. At S201, the diagnosis processing unit 224 reads out report data from the device-information storing unit 230.

FIG. 4 is a diagram illustrating a data structure of report data accumulated in the device-information storing unit 230 according to the first embodiment. As illustrated in FIG. 4, the report data holds various setting options associated with a management area ID and a device ID. In the example illustrated in FIG. 4, the setting options include, but not limited to, a communication address (IP address), network robustness (communication encryption method), presence or absence of identity authentication, whether or not administrator's password is its initial value (default password), the length of the administrator's password, mixture state of character types included in the administrator's password (including whether or not the password includes an alphabetic character and whether or not the password includes a numeric character), presence or absence of forced logout setting (automatic logout function), presence or absence of a maximum number of failed password entries (lockout function), presence or absence of data erasure setting, and presence or absence of auxiliary storage device encryption (HDD encryption). Unless these security settings are appropriately set, an influence can be directly exerted on security of the under-management information device 110 and, furthermore, across the management area. Accordingly, in the first embodiment, the information denoted above is collected for diagnosis.

The forced logout setting (the automatic logout function) described above is a setting of enabling or disabling a function of forcefully logging out if a predetermined amount of idle time has elapsed since last login. The maximum number of failed password entries (the lockout function) is a setting of enabling or disabling a function of forcefully locking out login attempts if password entry for a specific account fails a predetermined number of times. The data erasure setting is a setting as to whether or not to completely erase data using a predetermined method. There are various data erasure methods including overwriting with zeros, overwriting with random patterns, and NSA method. Accordingly, the setting options may include designation of such a data erasure method.

As illustrated in FIG. 4, the report data may further include a dynamic security counter value(s) such as the login failure rate (the number of failed login attempts/total number of login attempts) and presence or absence of a network attack (DoS (denial of service) attack detection). Such security counter values as those described above indicate that there is suggested a possibility of an unauthorized attempt to access the under-management information device 110. Accordingly, in the first embodiment, these values are collected for diagnosis. By also collecting such security counter values as those described above, security level can be maintained more than by diagnosing security setting.

Referring back to FIG. 3, at S202, the diagnosis processing unit 224 conducts security diagnosis on the per-under-management-information-device basis and on the per-management-area basis based on the report data about each of the under-management information devices 110 read out from the device-information storing unit 230. At S203, the diagnosis processing unit 224 stores results of the security diagnosis in the diagnosis-result storing unit 232. Then, the process ends.

FIG. 5 illustrates in detail the diagnosis process from S201 to S203 illustrated in FIG. 3. The process illustrated in FIG. 5 starts at S400 in accordance with the predetermined schedule. The diagnosis processing unit 224 repeats the loop from S401 to S410 so that the process from S402 to S409 is performed for each of the management area IDs under management of the diagnosis processing unit 224.

The device-security management server 120 manages all the under-management information devices each of which is pre-registered associated with a corresponding management area. FIG. 6A illustrates a data structure of management data that associates each of under-management information devices with a management area where the information devices are managed. As illustrated in FIG. 6A, management is carried out by associating each of device IDs of the under-management information devices with a management area ID. At S402, the diagnosis processing unit 224 reads out all the device IDs associated with a management area ID, which is currently processed, from the management data illustrated in FIG. 6A.

The diagnosis processing unit 224 repeats the loop from S403 to S407 so that the process from S404 to S406 is performed for each of the read-out one or more device IDs associated with the management area ID. At S404, the diagnosis processing unit 224 reads out latest regular report associated with the device ID, which is currently processed, from the device-information storing unit 230. At S405, the diagnosis processing unit 224 conducts security diagnosis based on the regular report associated with the device ID in accordance with one of the diagnosis policies 234 associated with the management area ID. At S406, the diagnosis processing unit 224 stores a result of the security diagnosis corresponding to the device ID in the diagnosis-result storing unit 232.

FIG. 6B is a diagram illustrating a data structure of a diagnosis policy to be referred to in the first embodiment. The diagnosis policy illustrated in FIG. 6B is managed in a state of being associated with a management area ID. In the diagnosis policy, each diagnosis item is associated with setting corresponding to predetermined conformance states. As an example of the conformance states, three states of "normal", "caution", and "warning" are given in the embodiment illustrated in FIG. 6B. However, the conformance states are not limited thereto, and the number of the conformance states may be two or, alternatively, four or more with finer granularity.

The diagnosis policy illustrated in FIG. 6B is described below. With reference to a diagnosis item "IP address", when a setting item "IP address" in report data is a local IP address, it is determined that the "IP address" is in the "normal" state; while if the same is a global IP address, it is determined that the "IP address" is in the "warning" state. With reference to a diagnosis item "network robustness", if a setting value (which is more specifically cipher strength of the value) of a setting item "network robustness" in the report data is an encryption method such as the SHA (secure hash algorithm)-2 or the 2048-bit RSA algorithm free from the Year 2010 problem, it is determined that the "network robustness" is in the "normal" state. If the setting value of the setting item "network robustness" is an encryption method such as the SHA-1 or the 1024-bit RSA algorithm that performs encryption but does not solve the Year 2010 problem, it is determined that the "network robustness" is in the "caution" state. If the setting value is "encryption disabled", it is determined that the "network robustness" is in the "warning" state. With reference to a diagnosis item "character type of password", if both of setting items "character type of password (alphabetic character)" and "character type of password (numeric character)" in the report data are "included", the "character type of password" is "mixture of alphabetic and numeric characters", in that case it is determined that the "character type of password" is in the "normal" state.

The diagnosis policy illustrated in FIG. 6B is only an example and may include other diagnosis items. Furthermore, various severities may be required by the diagnosis policy. For instance, although a global IP address is determined as the "warning" state according to the diagnosis policy illustrated in FIG. 6B, the diagnosis policy may be configured so as to determine a global IP address as the "caution" state.

FIG. 7 is a diagram illustrating a data structure of per-information-device diagnosis result data stored in the diagnosis-result storing unit 232 according to the first embodiment. The diagnosis result data illustrated in FIG. 7 is managed in a state of being associated with a management area ID and a device ID and contains diagnosis items and, for each the diagnosis items, a conformance state ("normal", "caution", or "warning") obtained as a diagnosis result for the diagnosis item.

Referring back to FIG. 5, when the diagnosis process for each of the read-out one or more device IDs associated with the management area ID is completed, processing exits the loop from S403 to S407 and proceeds to S408. At S408, the diagnosis processing unit 224 reads out diagnosis result data about the information devices identified by the one or more device IDs associated with the management area ID and conducts overall security diagnosis of an environment of the management area ID, which is currently processed, in accordance with a corresponding one of the diagnosis policies 234. At S409, the diagnosis processing unit 224 stores a result of the overall security diagnosis of the management area ID in the diagnosis-result storing unit 232.

FIG. 8 is a diagram illustrating a data structure of per-management-area security-diagnosis result data stored in the diagnosis-result storing unit 232 in the first embodiment. The diagnosis result data illustrated in FIG. 8 is managed in a state of being associated with a management area ID and contains diagnosis items and, for each of the diagnosis items, an overall result and conformance states of respective under-management information devices and remarks column. The per-management-area overall security diagnosis result illustrated in FIG. 8 is obtained by integrating security diagnosis results of the plurality of information devices 110 in the management area together. Under a diagnosis policy of a preferable embodiment, a conformance state that least conforms to the conformance criteria among conformance states of the diagnosis results of the plurality of information devices is determined as an overall diagnosis result. In short, it is determined that overall security environment of the management area is insufficient if there is even one security hole in any one of the under-management information devices in the management area.

The per-management-area security diagnosis result may contain findings about security setting. The findings can include findings of presence of a security threat, findings of a point where security does not conform to the policy, and findings of a mismatch of security setting items between information devices.

For instance, with reference to the diagnosis item "network robustness" of the security-diagnosis-result data illustrated in FIG. 8, two information devices (hereinafter, the information device whose device ID is 00A is referred to as "device A"; the information device whose device ID is 00B is referred to as "device B") are in the "normal" state, but the other one information device (hereinafter, the information device whose device ID is 00C is referred to as "device C) is in the "warning" state. Accordingly, the overall result is "warning" which is the state least conforming to the conformance criteria. Various supplemental descriptions are given in the remarks column. For example, the remarks column of the diagnosis item "network robustness" contains a comment that network encryption for the device C, which is in the "warning" state, is disabled.

With reference to the diagnosis item "password length", the overall result is "normal" because each of the three information devices has a sufficient password length. However, whereas the password length of the device A and the device B is 10 characters, that of the device C is 8 characters. Accordingly, a supplemental remark about this variation in the password length is given for the diagnosis policy. With reference to the diagnosis item "login failure rate", although the device C is in the "normal" state, the device A is in the "caution" state, and the device B is in the "warning" state. Accordingly, the overall security diagnosis result is "warning" which is the state least conforming to the conformance criteria.

Referring back to FIG. 5, if the process for each of the management areas ID under management of the device management system 100 is completed, processing exits the loop from S401 to S410 and proceeds to S411, where the process ends.

Referring back to FIG. 3, FIG. 3 illustrates a diagnosis-result reporting process as well. The diagnosis-result reporting process illustrated in FIG. 3 starts at S301 in response to occurrence of a preset event that triggers starting the preset reporting process. The diagnosis-result reporting process may be performed when, for example, reports for all the management area IDs have been generated or, alternatively, each time when a report for each of the management area IDs is generated.

At S301, the diagnosis processing unit 224 reads out integrated per-management-area diagnosis-result data from the diagnosis-result storing unit 232. At S302, the diagnosis processing unit 224 instructs the communication processing unit 221 to transmit the per-management-area diagnosis-result data read out from the diagnosis-result storing unit 232. At S303, the communication processing unit 221 transmits the diagnosis-result data received from the diagnosis processing unit 224 to the diagnosis-result providing server 140 using the transmitting unit 223. At S304, the diagnosis-result providing server 140 receives the diagnosis result data and stores the received diagnosis result data. Then, the process ends.

The processing from viewing the diagnosis result using the administrator's terminal 150 to making a settings change is described below with reference to FIG. 9. The viewing process illustrated in FIG. 9 starts at S501 in response to a login request made by a user from the administrator's terminal 150. At S501, the user performs a login to the diagnosis-result providing server 140 from the administrator's terminal 150.

FIG. 10A illustrates an example of a login screen 300. Referring to the login screen 300 illustrated in FIG. 10A, when a user enters a login ID of an administrator of the management area and a password to text boxes 302 and 304 and clicks a "LOGIN" button 306, a login request is transmitted from the administrator's terminal 150 to the diagnosis-result providing server 140, and login authentication is performed.

At S502, the administrator's terminal 150 transmits a diagnosis result request to the diagnosis-result providing server 140 and receives a diagnosis result. FIG. 10B illustrates an example of a menu screen 310 that appears after login authentication. The menu screen 310 contains a "DISPLAY RESULT" button 314 and an "EDIT POLICY" button 316. Clicking the "DISPLAY RESULT" button 314 on this screen causes a diagnosis result request to be transmitted from the administrator's terminal 150 to the diagnosis-result providing server 140.

FIG. 10C illustrates an example of a diagnosis-result display screen 320. The diagnosis-result display screen 320 contains a result table 326 presenting a per-management-area diagnosis result. A user can obtain findings about security settings for the management area by viewing the diagnosis-result display screen 320. The diagnosis-result display screen 320 illustrated in FIG. 10C corresponds to the per-management-area security-diagnosis-result data illustrated in FIG. 8 and contains per-management-area overall results and per-information-device diagnosis results. In the first embodiment, the result table 326 contains a "WARNING" button in a cell where an overall result is in a "warning" state.

Figure 11A:
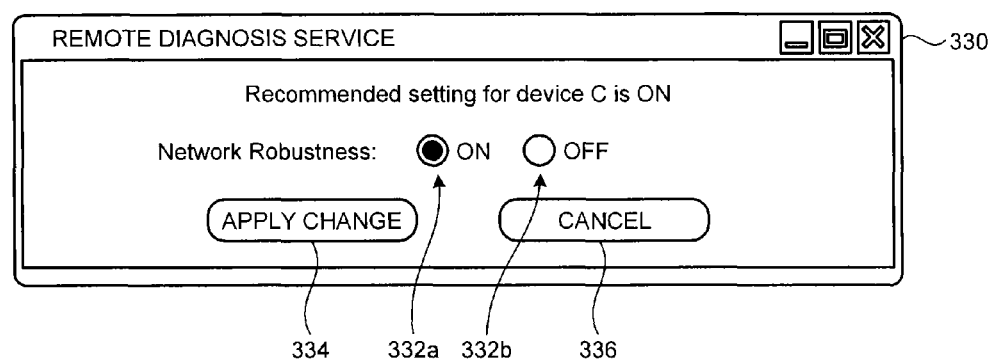
FIGS. 11A and 11B are diagrams illustrating other graphical user interfaces displayed on the administrator's terminal according to the first embodiment.

FIG. 11A illustrates an example of a setting changing screen 330. Clicking the "WARNING" button on the diagnosis-result display screen 320 illustrated in FIG. 10C causes the setting changing screen 330 illustrated in FIG. 11A to display. The setting changing screen 330 contains radio buttons 332 for specifying whether to enable or disable the setting item "network robustness", an "APPLY CHANGE" button 334 for accepting an instruction of changing to current settings, and a "CANCEL" button 336 for accepting an instruction of cancellation of a settings change.

At S503, the administrator's terminal 150 transmits a request for a settings change to the diagnosis-result providing server 140. When, on the setting changing screen 330 illustrated in FIG. 11A, a desired settings change is selected using one of the radio buttons 332 and the "APPLY CHANGE" button 334 is clicked, a request for the settings change is transmitted from the administrator's terminal 150 to the diagnosis-result providing server 140.

Figure 11B:
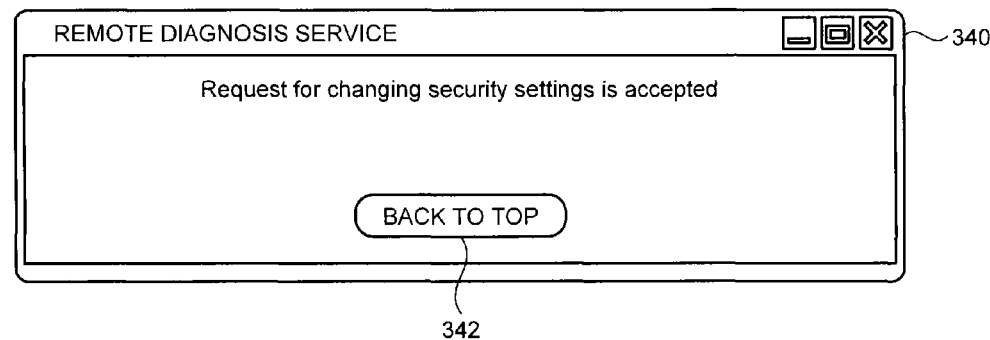

Upon receiving the request for the settings change, the diagnosis-result providing server 140 transfers the request for the settings change to the device-security management server 120 at S504. The setting-value changing unit 236 accepts the request for the settings change via the communication processing unit 221 and, at S505, performs setting-value check and format conversion. At S506, the setting-value changing unit 236 instructs the communication processing unit 221 to transmit a request for the settings change. At S507, the communication processing unit 221 causes the setting-value temporary-storage unit 238 to temporarily store the request for the settings change. Then, the process is temporarily held. A response is returned to the administrator's terminal 150, and a result to the request for the settings change is displayed. FIG. 11B illustrates an example of a settings-change completion screen 340 where a message indicating that the request for the settings change is accepted is displayed. If a "BACK TO TOP" button 342 is clicked, the menu screen 310 illustrated in FIG. 10B appears.

In practice, changing a setting value is started by the under-management information device 110. At S601, the information device 110 initiates communication, such as polling, to the device-security management server 120. Upon receiving the communication, the communication processing unit 221 of the device-security management server 120 reads out the temporarily-stored request for the settings change from the setting-value temporary-storage unit 238 at S602, and transmits the request for the settings change, together with a response to the communication, to the under-management information device 110 using the transmitting unit 223 at S603. At S604, the under-management information device 110 performs the settings change. Then, the process ends.

In the first embodiment, it is assumed that diagnosis results are provided in the form of web page; however, the form of the diagnosis results is not limited thereto. For instance, the diagnosis results may be provided in the form of spread sheet. In this case, a cell of a diagnosis item containing "warning" may be hyperlinked to a URL (uniform resource locator) of a location where a corresponding setting value can be changed.

A summary of a procedure for a service user to access the diagnosis-result providing server 140, check a diagnosis result, and make a settings change based on the diagnosis result using the diagnosis-result providing server 140 is given below. First, the service user accesses the diagnosis-result providing server 140 by utilizing, for example, a web browser from the administrator's terminal 150. When the user is login-authenticated via the browser, the function select menu illustrated in FIG. 10B is displayed. When a menu is selected, the diagnosis-result display screen illustrated in FIG. 10O is displayed. If the "WARNING" button in the table is clicked, such a related setting menu as that illustrated in FIG. 11A is displayed. On this menu, the service user can click an "APPLY CHANGE" button to change a specific setting value on the web browser. Because the device-security management server 120 and the diagnosis-result providing server 140 are connected to each other via a network, a request for the settings change is fed to the device-security management server 120. The setting value involved in the change is temporarily stored in the device-security management server 120. At a next communication with this information device 110, the setting value is transmitted to the information device via the public network 106 as the request for the settings change. Eventually, the setting value is changed.

Figure 12A:
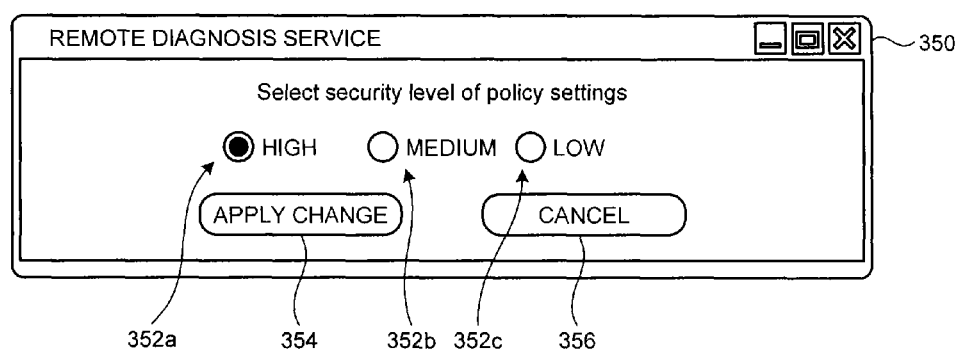
FIGS. 12A and 12B are diagrams illustrating still other graphical user interfaces displayed on the administrator's terminal according to the first embodiment.
Figure 12B:
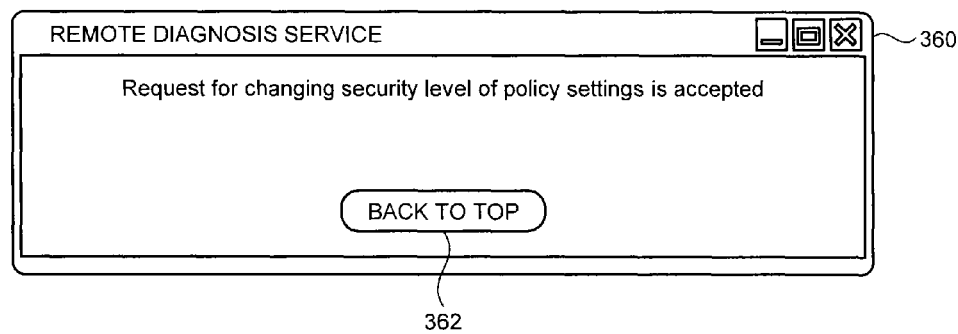

A change of a setting value has been described above. A change of a diagnosis policy is described below with reference to FIGS. 12A and 12B. A policy change is mainly usable in adjusting security level of under-management information devices to be equivalent to that of a personal computer or a network server which is out of management. In short, the change of a diagnosis policy is performed to maintain security quality levels of the whole office uniform by adapting to customer's security policy. FIGS. 12A and 12B are diagrams illustrating GUIs for changing a diagnosis policy described above. FIG. 12A illustrates an example of a policy change screen 350. Clicking the "EDIT POLICY" button 316 on the menu screen 310 illustrated in FIG. 10B causes the policy change screen 350 illustrated in FIG. 12A to display. The policy change screen 350 contains radio buttons 352 for selecting a security level of policy settings from "high", "medium", and "low", an "APPLY CHANGE" button 354 for accepting an instruction of a policy change to current settings, and a "CANCEL" button 356 for accepting an instruction of cancellation. The policy settings denote to set a policy including cipher strength and a password length as a criteria of security determination. In this example, security strength of the policy is classified into three levels of high, medium, and low. When the security level of the policy settings is changed from "low" to "medium", and then to "high", the security strength is relatively increased in this order.

When, on the policy change screen 350 illustrated in FIG. 12A, a desired security level is selected using one of the radio buttons 352 and the "APPLY CHANGE" button 354 is clicked, a request for this policy change is transmitted from the administrator's terminal 150 to the diagnosis-result providing server 140. Upon receiving the request for the policy change, the diagnosis-result providing server 140 transfers the request for the policy change to the device-security management server 120. The device-security management server 120 accepts the request for the policy change and changes a policy to be applied to the management zone associated with the login ID to a predetermined policy associated with the selected security level ("high", "medium", or "low"). It is assumed that predetermined policies associated with the respective values are defined in advance. A response is returned to the administrator's terminal 150 and a result to the request for the policy change is displayed. FIG. 12B illustrates an example of a policy-change completion screen 360 where a message indicating that the request for the policy change is accepted is displayed. If a "BACK TO TOP" button 362 is clicked on the policy-change completion screen 360, the menu screen 310 illustrated in FIG. 10B is displayed.

In the first embodiment described above, a security diagnosis result is reported in the form of report. Hereinafter, a second embodiment is described below with reference to FIG. 13. In the second embodiment, if a diagnosis result contains a suggestion for correcting a setting value and if automatic correction of the suggested point is permitted by an administrator of the management area, the device-security management server 120 automatically corrects the setting value.

FIG. 13 is a flowchart illustrating a diagnosis process to be performed on the per-information-device basis and on the per-management-area basis by the diagnosis processing unit according to the second embodiment. The process illustrated in FIG. 13 is partly identical to the process illustrated in FIG. 5 and therefore what makes the process illustrated in FIG. 13 different from that illustrated in FIG. 5 is mainly described below. The process illustrated in FIG. 13 starts at S700 in accordance with a predetermined schedule as does the process illustrated in FIG. 5. The diagnosis processing unit 224 repeats the loop from S701 to S712 so that the process from S702 to S711 is performed for each of the management area IDs under management of the diagnosis processing unit 224. At S702, the diagnosis processing unit 224 reads out every device ID associated with the management area ID which is currently processed.

The diagnosis processing unit 224 repeats the loop from S703 to S709 so that the process from S704 to S708 is repeatedly performed for each of the read-out one or more device IDs associated with the management area ID. At S704, the diagnosis processing unit 224 reads out latest regular report associated with the device ID from the device-information storing unit 230. At S705, the diagnosis processing unit 224 conducts security diagnosis based on the regular report associated with the device ID in accordance with a corresponding one of the diagnosis policies 234. At S706, the diagnosis processing unit 224 stores a result of the security diagnosis of the device ID in the diagnosis-result storing unit 232.

In the second embodiment illustrated in FIG. 13, at S707, the diagnosis processing unit 224 further determines whether or not the diagnosis result contains a suggestion for correcting a setting value. In the second embodiment, it is assumed that the administrator has permitted automatic correction in advance. If it is determined that the diagnosis result contains a suggestion for correcting a setting value (YES at S707), processing proceeds to S708. At S708, the diagnosis processing unit 224 issues a request for a settings change of the information device identified by the device ID. The request for the settings change is, as in the case where request is issued from the administrator's terminal 150, temporarily stored in the setting-value temporary-storage unit 238 and transmitted to the information device 110 when communication from the information device 110 is initiated. A specific embodiment may be configured such that, when automatic correction is performed, a log about the automatic correction is recorded in the diagnosis result.

On the other hand, if it is determined that the diagnosis result does not contain a suggestion for correcting a setting value (NO at S707), processing proceeds directly to S709. When the diagnosis process for each of the read-out one or more device IDs associated with the management area ID is completed, processing exits the loop from S703 to S709 and proceeds to S710. The process from S710 to S713 is similar to the process from S408 to S411 and therefore detailed description is omitted.

Figure 14:
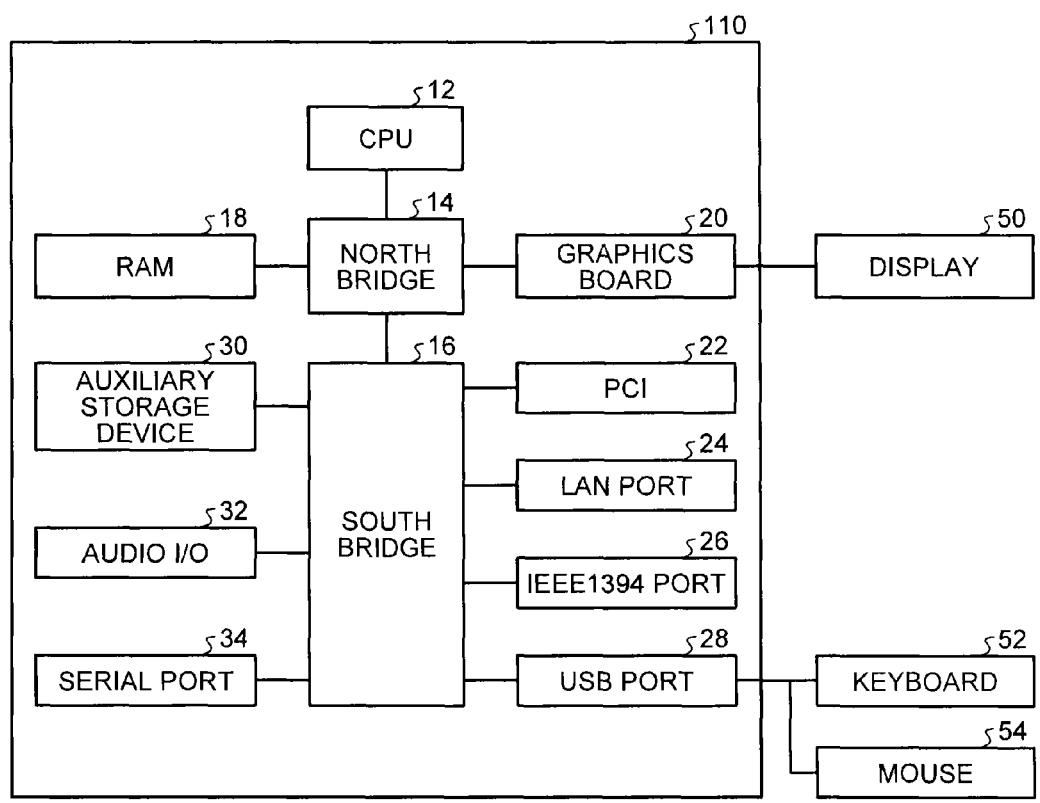
FIG. 14 is a diagram illustrating a hardware configuration of a device security management server according to the first (second) embodiment.

A hardware configuration of the device-security management server 120 according to the present embodiments is described below with reference to FIG. 14. FIG. 14 is a diagram illustrating the hardware configuration of the device-security management server 120 according to the present embodiments. The device-security management server 120 according to the present embodiments is implemented as a general-purpose computer such as a desktop personal computer or a workstation. The device-security management server 120 illustrated in FIG. 14 includes a single-core or multi-core CPU (central processing unit) 12, a north bridge 14 for connecting between the CPU 12 and a memory, and a south bridge 16 connected to the north bridge 14 via a dedicated bus or a PCI bus to provide connection with I/O (input/output) via the PCI bus, USB (universal serial bus), or the like.

A RAM (random access memory) 18, which provides a working area for the CPU 12, and a graphics board 20, which outputs video signals, are connected to the north bridge 14. The graphics board 20 is connected to a display 50 via a video output interface such as analog RGB, HDMI (high-definition multimedia interface) (registered trademark), DVI (digital visual interface), or DisplayPort (registered trademark).

A PCI (peripheral component interconnect) 22, a LAN port 24, an IEEE (Institute of Electrical and Electronics Engineers 1394) 1394 port 26, an USB port 28, an auxiliary storage device 30 such as an HDD (hard disk drive) or an SSD (solid state drive), audio I/O 32, and a serial port 34 are connected to the south bridge 16. The auxiliary storage device 30 stores OS (operating system) for controlling the computer, control programs for implementing functional units described above, various system information, and various setting information. The LAN port 24 is an interface device for connecting the device-security management server 120 to the LAN 104.

An input device such as a keyboard 52 or a mouse 54 may be connected to the USB port 28. The USB port 28 can provide a user interface for accepting various instructions entered by an operator of the device-security management server 120. The device-security management server 120 according to the present embodiments implements the functional units and processes described above by reading out the control programs from the auxiliary storage device 30 and loading the programs in the working area provided by the RAM 18 under control of the CPU 12. The device-security management server 120 has been described above with reference to FIG. 14. Each of the diagnosis-result providing server 140 and the administrator's terminal 150 may be implemented in a similar hardware configuration. Although detailed description of the MFP 110, the laser printer 112, the projector 114, and the teleconference terminal 116 are omitted, they may be configured to include a CPU, a RAM, a network interface, and the like in a similar manner.

According to the present embodiments described above, information management apparatuses, information management methods, and information devices for being capable of remotely diagnosing setting of the information devices in a management area where the information devices are installed and adapting to an environmental change in the management area can be provided.

In the present embodiments, current security settings of the under-management information devices 110 to 116 are regularly diagnosed by the device-security management server 120. Results of the security diagnosis are integrated on a per-management-area basis and provided to a user. Accordingly, the present embodiments described above allow remotely diagnosing setting of information devices in a management area and adapting to an environmental change in the management area where the information devices are installed.

The functional units can be implemented in computer-executable program instructions described in a legacy programming language or an object-oriented programming language such as assembly language, C, C++, C#, or Java (registered trademark), and can be distributed as being stored in a device-readable recording medium such as a ROM (read only memory), an EEPROM (electrically erasable/programmable read only memory), an EPROM (erasable programmable read-only memory), a flash memory, a flexible disk, a CD-ROM, a CD-RW (compact disc-rewritable), a DVD-ROM, a DVD-RAM, a DVD-RW, a blue-ray disk, an SD (secure digital) card, or an MO (magneto optical) or via a telecommunication line.

According to an aspect of the present invention, it is possible to remotely assess setting of information devices in a management area where the information devices are installed and adapting to an environmental change in the management area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information management apparatus for managing information about information devices connected to the information management apparatus via a network, the information management apparatus comprising:
   a memory configured to store
      first information in which a plurality pieces of identifying information that identify a plurality of management areas are respectively associated with a plurality of information devices applied to the plurality of management areas, and
      second information in which each management area is associated with one or more diagnosis policies that are different from diagnosis policies associated with other management areas, the diagnosis policies being utilized to diagnose setting contents of the information devices applied to the plurality of management areas; and circuitry configured to
   identify the plurality of information devices associated with each of the plurality of management areas based on the first information,
   acquire information about a setting from the plurality of information devices,
   diagnose, with respect to each of the plurality of information devices identified and associated with each of the plurality of management areas, the setting of each information device based on the acquired information and the one or more diagnosis policies associated with the management area associated with each information device,
   generate a diagnosis result report containing findings about the setting based on a diagnosis result associated with a management area associated with the plurality of information devices, and
   output the generated diagnosis result report.

2. The information management apparatus according to claim 1, wherein the acquisition unit is configured to
   receive an instruction from user for changing setting based on the diagnosis result report, and
   the output unit is configured to transmit a request for changing setting based on the instruction to the information device required the changing setting.

3. The information management apparatus according to claim 2, further comprising
   a storage unit configured to store the request received by the acquisition unit,
   wherein the out rut unit is configured to transmit the request to the information device when communication, after the information management apparatus receives the request, from the information device occurs.

4. The information management apparatus according to claim 2,
   wherein the output diagnosis result report is provided to a diagnosis-result providing device which provides an user interface for viewing the diagnosis result, and the request provided to the diagnosis-result providing device is transferred to the information management apparatus.

5. The information management apparatus according to claim 1, wherein the one or more diagnosis policies contain information associating each of possible setting options for a predetermined diagnosis item with a conformance status.

6. The information management apparatus according to claim 1,
wherein the circuitry is configured to generate a device result report of each management area, by integrating each diagnosis result of the plurality of the information devices associated with the management area,
wherein when integrating, conformance status which is the most far from a conformance level among results of the devices is determined as a total diagnosis result.

7. The information management apparatus according to claim 1, wherein the circuitry is configured to issue a request for correction of a setting value contained in the diagnosis result report of the plurality of information devices, when the diagnosis result report contains a suggestion for correction of the setting value and when the correction is permitted in the management area.

8. The information management apparatus according to claim 1,
wherein the setting is a security setting, and
suggestions and comments about the setting include at least one of a suggestion that there is a security threat, indication of a setting value not conforming to the policy, and mismatch of security setting between information devices.

9. The information management apparatus according to claim 1, wherein the information about the setting of the plurality of information devices includes at least one setting item of a communication address assigned to the information device, a communication encryption method, whether or not identity authentication is required, whether or not administrator's password is a default value, length of the administrator's password, mixture state of character types of the administrator's password, whether or not forced logout option is enabled, whether or not a maximum number of failed password entries is set, whether or not data erasure option is enabled, and whether or not auxiliary storage device encryption is enabled.

10. The information management apparatus according to claim 1, wherein the information about the setting of the plurality of information devices further includes one of a login failure rate and whether or not a network attack has occurred.

11. An information management method to be performed by a computer to manage information about information devices connected to the computer via a network, the information management method comprising:
storing, in a memory, first information in which a plurality of pieces of identifying information that identify a plurality of management areas are respectively associated with a plurality of information devices applied to the plurality of management areas;
storing, in the memory, second information in which each management area is associated with one or more diagnosis policies that are different from diagnosis policies associated with other management areas, the diagnosis policies being utilized to diagnose setting contents of the information devices applied to the plurality of management areas;
identifying the plurality of information devices associated with each of the plurality of management areas based on the first information;
acquiring information about a setting from the plurality of information devices;
diagnosing, with respect to each of the plurality of information devices identified and associated with each of the plurality of management areas, the setting of each information device based on the acquired information and the one or more diagnosis policies associated with the management area associated with each information device;
generating, via circuitry, a diagnosis result report containing findings about the setting based on a diagnosis result associated with a management area associated with the one or more information devices are;
outputting the generated diagnosis result report; and diagnosing, via the circuitry, the setting of each information device based on the acquired information and the one or more diagnosis policies associated with the management area associated with each information device.

12. The information management method according to claim 11, further comprising:
receiving an instruction from user for changing setting based on the diagnosis result report, and
transmitting a request for changing setting based on the instruction to the information device required the changing setting.

13. An information device remotely connected to an information management apparatus via a network, the information management apparatus managing information about the information device, the information device comprising:
circuitry configured to
report information about a setting of the information device to the information management apparatus,
the information management apparatus
conducting diagnosis of the setting of the information device based on the information about the setting of the information device, and
generating, based on diagnosis results associated with a management area associated with the information device, a diagnosis result report containing suggestions and comments on the setting in the management area,
wherein the information management apparatus includes a memory configured to store
first information in which a plurality of pieces of identifying information that identify a plurality of management areas are respectively associated with a plurality of information devices applied to the plurality of management areas, and
second information in which each management area is associated with one or more diagnosis policies that are different from diagnosis policies associated with other management areas, the diagnosis policies being utilized to diagnose the setting contents of the information devices applied to the plurality of management areas,
wherein circuitry of the information management apparatus is configured to
identify the plurality of information devices associated with each of the plurality of management areas based on the first information, and
diagnose, with respect to each of the plurality of information devices identified and associated with each of the plurality of management areas, the setting of the information device based on the reported information and the one or more diagnosis policies associated with the management area associated with the information device.

14. The information device according to claim 13, further comprising a setting changing unit configured to receive a request for changing setting based on the diagnosis result report from the information management device and change setting of the information device.

15. The information management apparatus according to claim 1, wherein the circuitry is configured to receive an instruction from a user for changing the setting based on the diagnosis result report.

16. The method according to claim 11, further comprising:
receiving an instruction from a user fir changing the setting based on the diagnosis result report.

17. The information device according to claim 13, wherein the circuitry is configured to receive an instruction from a user for changing the setting based on the diagnosis result report.

18. The information management apparatus according to claim 1, wherein the circuitry is further configured to generate, with respect to each of the plurality of management areas, a diagnosis result report associated with the management areas based on the diagnosis result associated with each of the plurality of information devices associated with the identified management areas.

19. The method according to claim 11, wherein the circuitry is further configured to generate, with respect to each of the plurality of management areas, a diagnosis result report associated with the management areas based the diagnosis result associated with each of the plurality of information devices associated with the identified management areas.

20. The information device according to claim 18, wherein the circuitry is further configured to generate, with respect to each of the plurality of management areas, a diagnosis result report associated with the management areas based on the diagnosis result associated with each of the plurality of information devices associated with the identified management areas.

* * * * *